May 28, 1929.　　　　E. B. OLIVER　　　　1,714,809
LUBRICATOR
Filed April 28, 1926
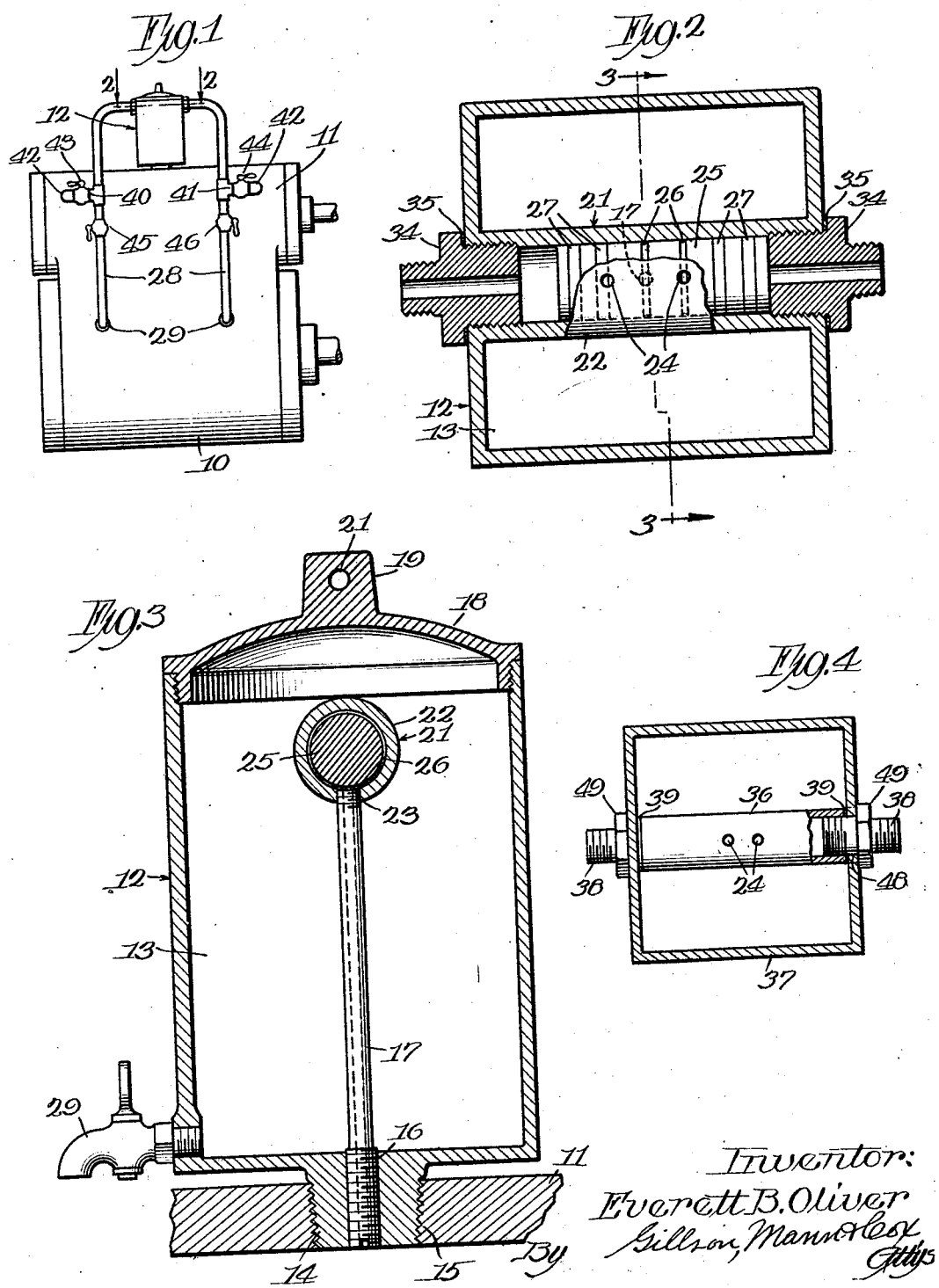
Inventor:
Everett B. Oliver Patented May 28, 1929.

1,714,809

UNITED STATES PATENT OFFICE.

EVERETT B. OLIVER, OF CHICAGO, ILLINOIS.

LUBRICATOR.

Application filed April 28, 1926. Serial No. 105,183.

This invention relates to lubricators, and more particularly to lubricators for the valve mechanism and pistons of locomotive and other types of steam engines.

One of the objects of the invention is the provision of new and improved lubricator mechanism for delivering a lubricant to the valve mechanism and piston of a locomotive by gravity.

Another object of the invention is the provision of a lubricator provided with new and improved means for maintaining the lubricant in a liquid state and for feeding the same by gravity to the parts to be lubricated.

A further object of the invention is the provision of a new and improved lubricator that will positively feed lubricant to a duct or passage leading downwardly into the valve chamber of a steam engine.

A still further object of the invention is the provision of a new and improved lubricator that is cheap to manufacture, easily assembled, positive in action, composed of a minimum number of moving parts, that is efficient in operation and that is not likely to become broken or get out of order.

Other and further objects and advantages of the invention will appear from the following description taken in connection with the accompanying drawings, in which Fig. 1 is a side elevation of a conventional cylinder and valve chest of a locomotive, showing the invention in position thereon;

Fig. 2 is a section on line 2—2 of Fig. 1, with parts broken away;

Fig. 3 is a section on line 3—3 of Fig. 2; and

Fig. 4 is a horizontal section of a modified form of the device, taken on a reduced scale.

It has been proposed to provide an oil reservoir and a valve mechanism for permitting the lubricant to pass by gravity into the valve chamber, but in this device the reservoir was located in the cab, and hence necessitated the use of long conduits for conducting the oil to the chamber, and in cold weather the operation of the device was unsatisfactory because the oil would congeal in the passages.

It is the common practice to supply a lubricant to the valve chamber of steam engines by force feed, but this arrangement consumes considerable power and necessitates the use of complicated mechanism. The present arrangement maintains the lubricant in a fluid state and eliminates the necessity of employing means for forcing the lubricant into the valve chamber. It also greatly simplifies the mechanism necessary for lubricating the piston and valve bearings.

In order to illustrate the application of one embodiment of the invention, there is shown at 10 and 11 a cylinder and steam chest or valve chamber respectively of a locomotive, although it is understood that the lubricator may be employed on other types of engines equally as well as on the locomotive.

The lubricator 12 is preferably attached to the upper side of the valve chamber 11 and comprises a receptacle 13 which may be of any desired shape in cross-section, that shown being rectangular, as clearly shown in Fig. 2. The lower end or bottom of the receptacle 13 is provided with a threaded boss or projection 14 which is adapted to be screwed into a corresponding opening 15 in the upper wall of the valve chamber 11 (see Fig. 3). The projection 14 is provided with a bore 16 in which is secured a pipe 17 extending upwardly within said receptacle. This pipe, being secured in the wall of the valve chamber, is constantly filled with live steam under boiler pressure, and consequently will heat the lubricant in the reservoir and maintain the same in a liquid state as will presently appear.

The receptacle 13 is provided with a lid or closure 18 which may be and preferably is screwed into the upper end of the receptacle which is drawn in at the corners to form a round upper portion for receiving the same. The lid may be provided with a projection 19 which is preferably though not necessarily provided with an opening 21 for receiving a tool for turning the lid or closure 18.

Suitable means are provided on the upper end of the tube 17 for transferring the lubricant from the receptacle to the tube 17. In order to maintain the lubricant at a level above the top of said tube the means for transferring the lubricant is so constructed that it conveys steam into the receptacle where it is condensed, and being heavier than the lubricant will sink to the bottom, thus maintaining the level of the lubricant above the end of the pipe. In the form of the device selected to illustrate one embodiment of the invention a reciprocating mechanism is employed for this purpose.

As shown, a valve mechanism 21 is mounted on the upper end of the pipe 17. This mechanism comprises a head or cylinder 22 having an opening 23 in its under surface in which the upper end of the pipe 17 is secured. Preferably, though not necessarily, the pipe 17 has its upper end reduced and screw-threaded whereby it may be inserted through the opening 16 and screwed into the cylinder and into the screw-threaded opening in the projection 14, simultaneously.

The cylinder 22 is provided with one or more openings 24 on its upper surface for the admission of lubricant, as will presently appear. As shown, two openings are employed so that the device will be double acting. The cylinder 22 is provided with a piston 25 which is adapted to reciprocate in said cylinder. The piston is provided with a pair of annular grooves 26 so arranged that when the piston is at one end of the cylinder one of the grooves will register with one of the openings in the upper wall and the other will register with the opening leading to the tube 17, and vice versa. The ends of the piston are preferably provided with rings or other packing 27 for preventing the escape of steam past the same. The ends of the cylinder 22 are closed by screw-threaded, apertured plugs 34. Packing 35 may be inserted between shoulders on said plugs and the ends of the cylinder 22 as shown in Fig. 2, for preventing escape of steam.

Means are provided for automatically reciprocating the piston 25. As shown, pipes 28 are secured to the plugs 34 and have their lower ends secured in suitable openings 29 in the end portions of the cylinder 10, whereby when steam is alternately admitted to and exhausted from the ends of the cylinder 10 it will be simultaneously admitted to and exhausted from the corresponding ends of the cylinder 22 for reciprocating the piston 25.

In the operation of the device, the receptacle 13 is filled with a suitable lubricant to a level above the pipe 17 and valve mechanism 21. The steam in the pipe 17 will maintain the lubricant in a liquid state. As steam is admitted alternately into the ends of the cylinder 10 and exhausted therefrom it will likewise be admitted alternately into and exhausted from the ends of the cylinder 22, thus reciprocating the piston 25. When one of the grooves 26 is moved into register with an opening 24 the steam contained therein will expand and escape through said opening into the receptacle, and being condensed will sink into the mass of lubricant, thus replacing the lubricant that has been taken away by the other opening. When the steam has escaped the lubricant enters the opening and when the piston is moved in the opposite direction into alinement with the pipe 17 the pressure on the lubricant in said opening becomes equalized,—that is, it becomes that of the steam within the pipe 17, consequently the lubricant is free to flow by gravity down into the pipe 17. By employing two grooves 26 in the piston 25, as shown, one will be discharging steam into the reservoir and receiving an increment of lubricant while the other will be discharging lubricant into the pipe 17 and receiving an increment of steam under pressure, and vice versa. Furthermore, the pressure of the steam in the grooves will be the same all around the piston, thus providing a substantially balanced valve.

Should the lubricant for any reason be removed faster than it is replaced by condensed steam the result will be that as soon as the oil level falls below the cylinder 22 no more oil will be removed until sufficient condensed steam has been added to the contents of the receptacle to raise the level above said cylinder 22.

The water from the condensed steam will continue to rise in the receptacle, thus maintaining the oil level above the cylinder 22 until the oil is exhausted. In practice the water is removed from the receptacle 13 through a cock 29 from time to time and a fresh supply of oil added as occasion may require.

It will be noted that with this arrangement, when the engine is not operating there is no lubricant being supplied to the valve chamber, thus economizing in the use of oil.

If desired, the pipes 28 may be connected to the steam chest 11 as by means of the pipes 40 and 41, each of which is in communication with one of said pipes 28 at one of its ends and has its other end secured in one of the openings or peep holes 42 in said chest. Valves 43 and 44 may be inserted in the pipes 40 and 41 for closing said pipes. Likewise the pipes 28 are provided with valves 45 and 46 for closing said pipes.

The passages or pipes 40 and 41 are only useful during abnormal operation of the locomotive piston, as when the packing blows out and there is considerable back pressure of steam due to the same leaking past the piston during its operation. Under normal operating conditions the peep holes 42 would be covered by the valve, but when the packing blows out, or for other reasons the steam leaks past the piston, the valve is set to make longer strokes and under those conditions these ports or openings are uncovered. Then if the valves 45 and 46 in the pipes 28 be closed and the valves 43 and 44 in the pipes 40 and 41 be opened, steam from the steam chest will operate the oil distributing valve 25 independently of the operation of the locomotive piston.

In assembling the form of the device shown on the drawing, the piston 25 is placed in position, and the plugs 34 are inserted. The tube 17, which has the diameter of its upper end reduced, is inserted through the opening 16 and simultaneously screwed into the opening 16 and head or cylinder 22. The projection 14 is now screwed in the opening 15 and the pipes 28 attached.

In the modified form of the device shown in Fig. 4, the cylinder 36 is a separate element and is secured in position by the plugs 38, gaskets 39 being used between the ends of the cylinder 36 and the inner walls of the receptacle 37 to prevent the escape of steam. The openings 48 through the side walls of the receptacle 37 are not threaded, whereby the walls may be clamped against the ends of the cylinder by the shoulders 49 on the plugs 38, the slight resiliency of the walls permitting this clamping action.

While in this form of the device the cylinder 36 is clamped between the side walls of the receptacle, it is understood that the cylinder may extend through the walls and the plugs 38 be threaded in the ends thereof, with suitable packing between the shoulders 49 on the one hand, and the ends of the cylinder and walls of the receptacle on the other.

It is thought from the foregoing taken in connection with the accompanying drawings, that the construction and operation of my device will be apparent to those skilled in the art, and that various changes in size, shape, proportion and details of construction may be made without departing from the spirit and scope of the appended claims.

I claim as my invention:

1. In a lubricating device for a steam engine, a single reservoir adapted to contain a reserve supply of lubricant and having a projection adapted to be secured in the wall of a valve chamber, said projection being provided with a passage leading into said reservoir, a pipe rigidly secured in said passage and extending upwardly into said reservoir and means movable in one direction to deliver an increment of lubricant from said reservoir into said pipe, and movable in the opposite direction to deliver an increment of steam into said reservoir from said pipe where it is condensed for maintaining the liquid level in said reservoir at a predetermined height.

2. A lubricating device for a steam engine comprising a single lubricant reservoir adapted to contain a reserve supply of lubricant, having a passage through its lower wall, a pipe extending upwardly from said passage into said reservoir for delivering steam into the same whereby the condensate will maintain the lubricant at a predetermined level, a head on said pipe, and a valve member movably mounted in said head for intermittently conveying oil from said reservoir into said passage and for controlling the flow of steam into said reservoir.

3. A lubricating device comprising a lubricant reservoir having a passage through its wall, a pipe secured in said passage and extending upwardly within said reservoir, a head on said pipe, said head having apertures therein for conducting a lubricant from said opening to said pipe, and steam from said pipe through said opening into said reservoir where it condenses for maintaining the liquid level in said reservoir at a sufficient height to enter said opening, a piston having a recess therein slidably mounted in said head, and means for conducting steam only to said piston for reciprocating the same.

4. A lubricating device comprising a reservoir having a member extending into said reservoir, said member and the wall of said reservoir being provided with a passage leading to the exterior of said reservoir, said member being provided at its upper end with a transverse opening, a piston slidably mounted in said opening for controlling the supply of lubricant to said passage and for conducting steam from said passage to said reservoir, means for supplying steam alternately to the ends of said piston for reciprocating the same, and means for automatically maintaining the oil in said reservoir at a substantially constant level.

5. In combination, an engine cylinder provided with an opening through the wall adjacent each end thereof, a valve chamber above said cylinder, a reservoir for containing a lubricant, said reservoir being secured to said chamber and provided with an element extending into said chamber, said element being provided with a passage leading from said reservoir into said chamber for conducting the lubricant to said chamber and for supplying steam to said reservoir where it is condensed for maintaining the liquid level in said reservoir at a predetermined height.

6. In combination, a valve chamber for a steam engine, a reservoir secured in one wall of said chamber, a pipe in communication with said chamber and extending upwardly in said reservoir, a cylinder mounted on the upper end of said pipe, a piston for conducting oil in liquid form from said reservoir to said pipe and for conducting steam from said pipe to said reservoir where it is condensed for maintaining the liquid level in said reservoir at a predetermined height, and means for conducting steam to said piston for reciprocating the same.

7. In combination, a valve chamber, a lubricant receptacle secured in the upper wall of said chamber, a pipe extending upwardly in said receptacle, a cylinder at the upper end of said pipe, said cylinder having a pair of openings in its upper wall, a piston having a pair of grooves about the same and so arranged that when one groove registers with one of said openings for receiving lubricant from said receptacle and for discharging steam into said receptacle where it is condensed for maintaining the liquid level in said receptacle at a predetermined height, the other groove will register with said pipe for delivering lubricant to said pipe and receiving steam to deliver to said receptacle and pipes for alternately conducting steam to the ends of said cylinder for operating the same.

In testimony whereof I affix my signature.

EVERETT B. OLIVER.